Aug. 16, 1932.  L. L. BECK  1,872,567
DISCHARGE TUBE
Filed Aug. 7, 1928

Inventor
LEO L. BECK
By his Attorneys
Bohleber + Ledbetter

Patented Aug. 16, 1932

1,872,567

UNITED STATES PATENT OFFICE

LEO L. BECK, OF JACKSON HEIGHTS, NEW YORK, ASSIGNOR TO CLAUDE NEON LIGHTS, INC., OF NEW YORK, N. Y., A CORPORATION OF NEW YORK

DISCHARGE TUBE

Application filed August 7, 1928. Serial No. 297,923.

This invention relates to vacuum tube lighting systems, such for example as that comprising the well known positive column or gaseous conductor tube lights in which the passage of a high potential alternating current, say about 10,000 volts, through a column of more or less rarefied gas, such as neon, causes the tube contents to glow and radiate light.

In the patent to Georges Claude No. 1,125,476 dated January 19, 1915, there is described and claimed a luminous vacuum tube containing a rarefied gas and provided with internal electrodes for causing the vibration of the gas, said electrodes having an area exceeding 1.5 square decimeters per ampere to retard the vaporization of the electrodes and prevent the formation upon the walls of the tube of deposits containing gas, whereby the luminosity of the tube may be maintained constant for a considerable period of time without necessitating the replenishing of the tube with additional gas. This disintegration of the cathode is caused by the bombardment of the positive ions thereupon. In Claude's tube the electrode is negative while the field is positive and the cathode is cool.

The present invention seeks, in a gaseous conductor tube, to eliminate the bombardment of the cathode by the positive ions. To this end means is provided to generate electrons and send them out toward the center of the tube where they meet the positive ions travelling toward the cathode and neutralize them before said positive ions are able to strike the electrode and cause its disintegration. More specifically, the electrodes comprise tubular rods preferably disposed in the axis of the ends of the tube and connected respectively to a source of high potential alternating current, such as the secondary coil of a transformer to serve as the cathodes of the tube. These tubular rods are closed at their inner ends and are desirably coated with a high emitting material such as barium or strontium oxide. This coating, when highly heated as by a heating element disposed within the tubular electrode is adapted to generate the negative electrons.

In order that the invention may be clearly understood and readily carried into effect the same will now be described more fully with reference to the accompanying drawing, illustrating one embodiment by which this invention may be achieved, and in which.

Figure 1:
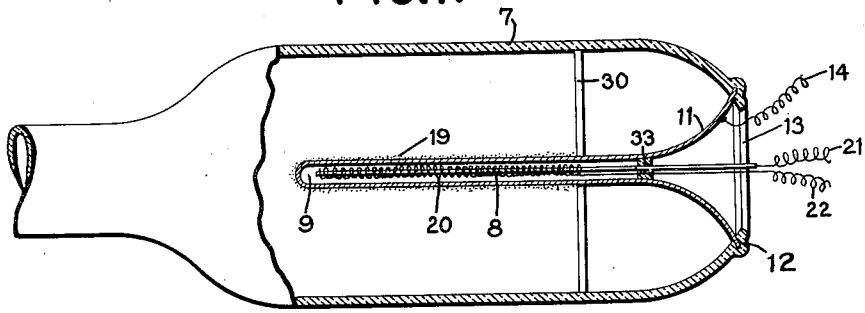
Figure 1 is a view showing the bulbous end or terminal portion of a gaseous conductor tube containing an electrode in accordance with this invention.
Figure 2:
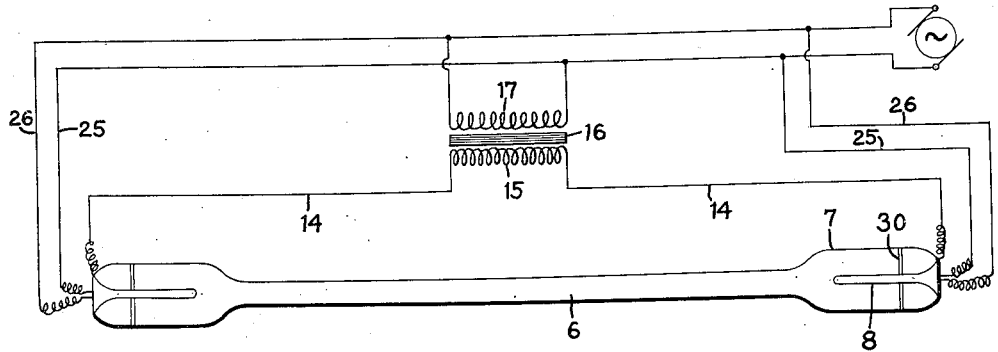
Figure 2 shows the tube and circuit by which it is energized.

The lighting system is illustrated in Figure 2 of the drawing as including the tubular envelope 6 of the tube light containing a rarefied inert gas, such as neon, and is shown as having bulb portions 7 within which the electrodes 8 in accordance with this invention are disposed. The electrodes 8 are preferably tubular in cross-section and are closed at their inner ends as at 9 and flare outwardly at their outer ends as at 11 to be sealed into the walls of the tube as shown at 12. The end of the tube defined by the seal 12 is open as shown at 13 for a purpose hereinafter to be described.

Each of the electrodes 8 is connected as by a lead 14 to the respective terminals of the secondary coil 15 of a transformer 16, the primary winding 17 of which is connected to a source of alternating current of say ordinary commercial voltage. So much of the construction as has just been described will result in the passage of an alternating current of high potential through the tube to effect the ionization of the gaseous contents and cause the emission of light.

While a source of high potential is illustrated conventionally as a transformer, it will be readily appreciated that provision must be made for the negative resistance of the tube. To this end, a leak transformer may be utilized or suitable reactance included in the circuit.

To prevent the bombardment of the cathode by positive ions coming from the mid portion of the tube, it is proposed to render a body of high emissivity within the ends of the tube incandescent to generate electrons and send them out toward the mid portion of the tube to meet the positive ions and neutralize them before such positive ions are able to strike the electrodes and cause the disintegration of the latter. The tubular electrode 8—9 is therefore coated with a material 19 having a high emissivity such as barium oxide or strontium oxide, which is rendered effective when the same is brought to a high temperature. To raise the temperature of the coating a removable heating coil such as illustrated as 20 is inserted within the tubular electrode 11. This heating coil may consist of a coil of resistance wire wound over refractory material and having its ends 21 and 22 extending through the opening 13 to be connected to leads 25—26 suitably connected to a source of current. Such source may take any convenient form. In the illustrated embodiment the leads 25—26 are shown as connected to the respective wires of the usual 110 volt commercial circuit.

If desired the electrodes 11 may be supported in spaced relation to the walls of the tube ends 7 by means of a spacer rod 30 secured to the tubular electrode and extending between the tubular walls of the bulb.

The surface area of the electrode 8 need not be in excess of 1.5 sq. decimeters per ampere, as was found necessary to long life of the tube provided with the Claude electrode but, instead, the disintegration of the electrode is prevented by the emission of electrons. By suitably proportioning the constants of the emissivity circuit, as it may be called, to wit the area or amount of high emitting material and the current fed the heating coil so as to control the amount of heat generated, the desired quantity of emitted electrons may be obtained.

Thus, if it is desired to change the amount of current flowing from the tube it is unnecessary to change the size of the electrode 8 but merely to change the rate of the electronic emission which can be accomplished by increasing the area covered by the high emission material or the current fed the heater element 20. The life of the tube is thus no longer a function solely of the electrode area but depends also upon the life of the high emitting material.

In the manufacture of the tube the electrode 8 is first coated with the high emitting material and provided with the transversely extending spacer rod 30 which may be secured thereto as by welding or sealing. The electrode is then inserted through the open end of the bulb portion 7 and a seal effected between the edge of the opening and the edge of the flaring portion 11 of the electrode 8. A heating element 20 may then be inserted through the opening 13 and secured therein in any convenient fashion as at 33. The bulb portion 7 may then be sealed in the usual manner to the tube portion 6. Then, as the tube is connected to a pump in the usual manner adapted to exhaust discharge tubes, the tube may be heated as in an oven, to drive out occluded gases from the walls of the tube and electrode. It may sometimes be convenient to furnish the electrode 8 with a getter such as is usually provided in the manufacture of filament lamps to aid in cleaning up the tube. The getter will aid in evacuating the bulb portions of the tube as is common in the manufacture of hot cathode thermionic devices. The tube may then be filled with neon or other inert gas which need not be previously purified by reason of the use of the getter.

It will thus be seen that a positive column tube has been provided in which the electrode is small and compact and thus readily lends itself to illuminating purposes. The tube can always be operated at the most efficient pressure and that pressure may be adopted, if desired, which requires the least energy or voltage to activate the tube.

Various modifications will occur to those skilled in the art in the composition and configuration of the electron emitting element, as well as in the form and composition of the electrode and also in the gaseous contents of the tube and no limitation is intended by the phraseology of the foregoing specification or illustrations in the accompanying drawing except as indicated in the appended claim.

What I claim is:

A gas discharge luminous tube containing a cathode comprising a hollow cylinder having a coating of thermoemissive material on the surface thereof exposed to the gas, and a transverse support extending from said cylinder to the envelope wall to brace said cylinder and maintain it in spaced relation from the envelope wall.

In testimony whereof I affix my signature.

LEO L. BECK.